United States Patent Office 2,824,041
Patented Feb. 18, 1958

2,824,041

PROCESS OF INDUCING HYPNOSIS BY UNSATURATED TERTIARY CARBINOLS

Abraham Bavley, Brooklyn, Morton Harfenist, Yonkers, and William M. McLamore, Flushing, N. Y., assignors to Chas. Pfizer & Co., Inc., Brooklyn, N. Y., a corporation of Delaware No Drawing. Application October 28, 1952
Serial No. 317,348

1 Claim. (Cl. 167—52)

This invention is concerned with certain highly unsaturated tertiary carbinols and with the preparation of these compounds. In particular, this invention is concerned with certain highly unsaturated teritary carbinols.

It has been found that certain tertiary carbinols, which are alkyl substituted pentene-1-yne-4-ol-3's, are highly useful. These compounds are substituted in the 3-position with a methyl or ethyl group, in the 5-position with an alkyl group having one to six carbon atoms and the 2-position is either unsubstituted or bears a methyl group. These materials possess soporific or hypnotic effects and also function as sedative agents. Where the 5-alkyl group is a methyl, the materials possess the highest biological activity. The activity decreases with increase in length of this alkyl chain. However, the products still retain appreciable activity when the 5-alkyl group is n-hexyl. The products in question may be designated by the following formula:

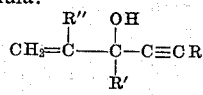

wherein R is an alkyl group having from one to six carbon atoms, R' is a methyl or ethyl group and R" is hydrogen or methyl.

The products with which we are concerned in this invention are prepared by the condensation under anhydrous conditions of an $\alpha,\beta$-unsaturated ketone chosen from the group methyl vinyl ketone, methyl isopropenyl ketone, ethyl vinyl ketone, and ethyl isopropenyl ketone with mono alkyl acetylenes where the alkyl group has between one and six carbon atoms. Alternatively a halogenated (preferably $\beta$-substituted) ketone may be used in the reaction as a source of the corresponding unsaturated (dehydrohalogenated) ketone. Thus, ethyl $\beta$-chloroethyl ketone serves as a source of ethyl vinyl ketone. Approximately equimolecular quantities of each reactant is used. The condensation is conducted in the presence of an alkaline condensing agent which is also generally used in about equimolecular proportion. It has been found that alkali metals, particularly lithium either as the metal or as lithium amide, in liquid ammonia are useful for this purpose. The metal, of course, combines with acetylene to form the acetylide, which reacts with the ketone. The ammonia may be diluted with an inert solvent, such as diethyl ether, without seriously detracting from the condensation reaction. In general these reactions are conducted at about the boiling point of liquid ammonia but when a low boiling solvent is used temperatures up to about the boiling point of the solvent (e. g. diethyl ether) may be employed. The reactions are completed in a few hours. The products are isolated by removal of the solvent and the alkaline condensing agent. The carbinols which result may be purified by standard methods such as distillation. The products prepared by the condensations are new substances never having been described before.

The new products that have been described above are useful for inducing sleep or sedation in various animals. They are colorless, mobile, moderately high-boiling organic liquids having characteristic odors. They have limited solubility in water but are more soluble in organic solvents such as alcohols, halogenated hydrocarbons and ethers. The solubility in propylene glycol is useful since this is an injectable vehicle. The compounds may be administered orally or by injection. Since the products are of relatively low toxicity considerable safety is attached to their use. However, since species variation may occur, dosage used with varying animals should be determined. In adult humans from about 250 milligrams to about 5 grams is a normal dose. The products may be administered as the pure compounds or diluted with various pharmaceutical carriers such as elixir bases, oils and so forth. They may be administered in capsules, in the form of elixirs or as other liquid preparations. It may be advisable to incorporate flavoring and sweetening agents to partially disguise the taste of the products.

The following examples are given by way of illustration and are not to be considered as the only manner in which this invention may be embodied. It is to be understood that protection hereof is only to be limited by the specific wording of the appended claim.

EXAMPLE I

*Preparation of 3-methyl-5-n-hexyl-pentene-1-yne-4-ol-3*

Liquid ammonia (400 mls.) was placed in a one-liter three-neck flask equipped with a stirrer, a Dry-Ice cooled condenser and a dropping funnel. The apparatus was protected from moisture and from carbon dioxide by means of a potassium hydroxide drying tube. To the ammonia was added 12.1 grams (0.525 mole) of lithium amide. The suspension was stirred rapidly and a solution of 66.7 grams (0.60 mole) of octyne-1 in an equal volume of ether was added rapidly. After a few minutes stirring, 35 grams (0.50 mole) of freshly distilled methyl vinyl ketone in three volumes of ether was added. The mixture was stirred at the reflux temperature of ammonia for six hours and 200 milliliters of ether was then added to the mixture. The liquid ammonia was allowed to evaporate overnight and the mixture was then poured onto ice containing 30 grams (0.50 mole) of acetic acid. The solution was adjusted with acetic acid to a weakly acidic pH. The ether layer was separated and the aqueous layer was extracted twice with 100-milliliter portions of ether. The ether extracts were washed with sodium bicarbonate solution to remove all acid and the extracts were then dried over anhydrous magnesium sulfate. The solvent was removed and the residual product was distilled. A total of 36.8 grams of redistilled product, boiling at 92° C. under 4 mm. pressure was obtained. This is a 40.8% yield.

*Analysis.*—Calcd. for: $C_{12}H_{20}O$: C, 79.94; H, 11.18. Found: C, 80.47; H, 11.20.

The density of this product is $D_4^{20}=0.846$. The refractive index of the product is $n_D^{26}=1.4560$.

EXAMPLE II

*3,5-dimethylpentene-1-yne-4-ol-3*

This product was prepared by condensation of methyl vinyl ketone and propyne in liquid ammonia containing lithium. The product was isolated in essentially the same manner indicated above. A product boiling at 92–98° C. under 101 mm. pressure was obtained in 41% yield.

*Analysis.*—Calcd. for: $C_7H_{10}O$: C, 76.32; H, 9.15. Found: C, 75.78; H, 9.24.

This material has a solubility of approximately 2% in water.

EXAMPLE III

3-methyl-5-n-butylpentene-1-yne-4-ol-3

This product was prepared by the condensation of methyl vinyl ketone with hexyne-1 in liquid ammonia in the presence of lithium. The product was obtained after the usual procedure for isolation and purification as a colorless liquid with a boiling point of 92–93° C. under 15 mm. pressure. The yield was 44.3%.

*Analysis.*—Calcd. for: $C_{10}H_{16}O$: C, 78.90; H, 10.60. Found: C, 78.83; H, 10.36.

EXAMPLE IV

Preparation of 2,3,5-trimethylpentene-1-yne-4-ol-3

A solution of 4.16 grams (0.6 mole) of lithium in 400 milliliters of liquid ammonia was treated with a stream of gaseous propyne until the blue color of the solution had disappeared. The stream of gas was discontinued shortly thereafter. A solution of 42 grams (0.5 mole) of methyl isopropenyl ketone in 100 milliliters of diethyl ether was added to the liquid ammonia solution drop by drop over a period of 20 minutes. Throughout the addition, the reaction mixture was stirred. The ammonia was allowed to reflux using a Dry Ice condenser for a period of three hours. The mixture was then diluted with 200 milliliters of diethyl ether and the ammonia was allowed to evaporate overnight. The solution was then treated with an excess of saturated ammonium chloride solution (70 mililiters) in order to convert the lithium to lithium chloride. The ether was removed from the solution by evaporation. The product was then fractionally distilled. The fraction containing most of the product was then redistilled to obtain 31.7 grams of highly purified product. This is a 51% yield. The boiling point of the product is 68.7 to 69.5° C. at 15 mm. pressure.

*Analysis.*—Calcd. for: $C_8H_{12}O$: C, 77.37; H, 9.74. Found: C, 77.55; H, 9.77.

Then density of the product is $D_4^{20}=0.8566$. The refractive index of the product is $n_D^{25}=1.4665$.

EXAMPLE V

Preparation of 3-ethyl-5-methyl-pentene-1-yne-4-ol-3

A solution of 7.7 grams (1.1 moles) of lithium in 800 milliliters of liquid ammonia was treated with an excess of propyne as described in Example IV above. A solution of 60.3 grams (0.5 mole) of ethyl β-chloroethyl ketone in diethyl ether was slowly added to the reaction mixture. The reaction mixture was worked up as usual by evaporation of the liquid ammonia after several hours of reaction. The residual solution was treated with a mixture of ice and acetic acid and the product was recovered. This material was distilled twice, and a yield of 7.2 grams (11.6%) was obtained. The product boiled at 68–69° C. under a pressure of 14 mm.

*Analysis.*—Calcd. for: $C_8H_{12}O$: C, 77.37; H, 9.74. Found: C, 77.16; H, 9.88.

This material has a solubility in water of about 6%. Its density is $D_4^{20}=0.905$. Its refractive index is $n_D^{25}=1.4670$.

It should be noted that when a halogenated ketone is used at least about two molecular proportions of the alkaline condensing agent are required per mole of ketone.

What is claimed is:

A process for inducting hypnosis in an animal which comprises administering an effective amount of a compound of the formula

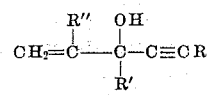

wherein R is an alkyl group containing between one and six carbon atoms, R' is selected from the group which consists of methyl and ethyl and R" is selected from the group consisting of hydrogen and methyl.

References Cited in the file of this patent

UNITED STATES PATENTS

| | | |
|---|---|---|
| 2,106,181 | Kreimeier | Jan. 25, 1938 |
| 2,425,201 | Oroshnik | Aug. 5, 1947 |
| 2,536,028 | Brothman et al. | Jan. 2, 1951 |
| 2,540,116 | Huber et al. | Feb. 6, 1951 |

FOREIGN PATENTS

| | | |
|---|---|---|
| 818,348 | Germany | Oct. 25, 1951 |

OTHER REFERENCES

Cymerman et al.: J. Chem. Soc. (1944), pp. 144–7.